M. F. NEWMAN.
SOLUTION FEEDER FOR WATER PURIFYING APPARATUS.
APPLICATION FILED APR. 21, 1909.

997,318.

Patented July 11, 1911.
2 SHEETS—SHEET 1.

WITNESSES:

INVENTOR,
Martin F. Newman
By F.W.H. Clay
his Atty.

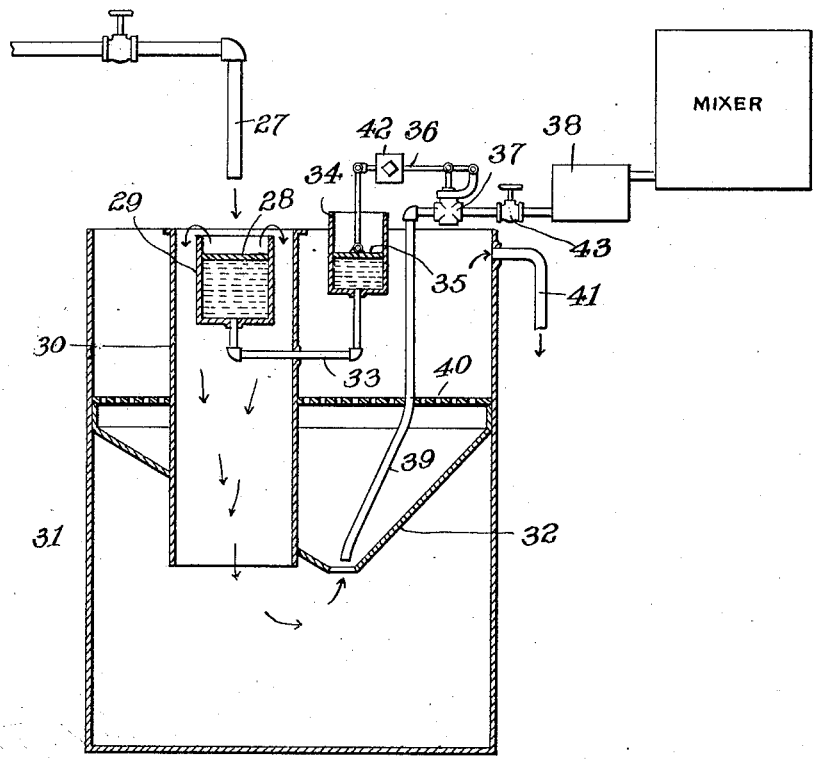

UNITED STATES PATENT OFFICE.

MARTIN F. NEWMAN, OF PITTSBURG, PENNSYLVANIA.

SOLUTION-FEEDER FOR WATER-PURIFYING APPARATUS.

997,318.  Specification of Letters Patent.  Patented July 11, 1911.

Application filed April 21, 1909. Serial No. 491,233.

*To all whom it may concern:*

Be it known that I, MARTIN F. NEWMAN, a citizen of the United States, residing at Pittsburg, in the State of Pennsylvania, have invented certain new and useful Improvements in Solution-Feeders for Water-Purifying Apparatus, of which the following is a specification.

My invention relates to means for feeding reagents, as in water purifying apparatus, where a chemical solution is added to the raw water to reduce impurities. Its primary object is to provide a solution feed which operates with either continuous or intermittent flow of the main supply and feeds the solution in exact proportion to the amount of raw water, under all varying conditions.

I have illustrated the invention in several preferred forms in the accompanying drawings, wherein—

Figure 1:
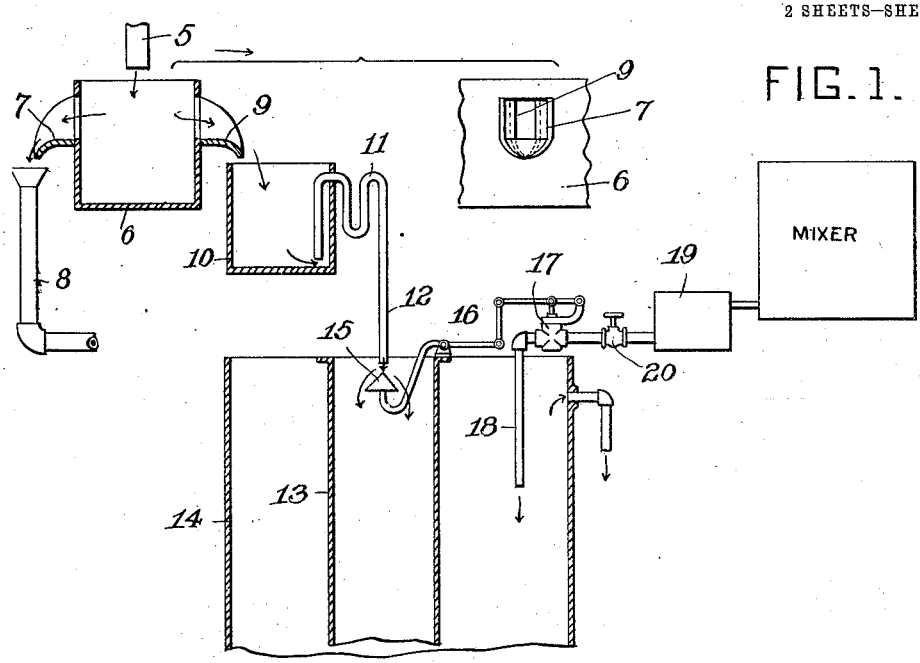
Figure 2:
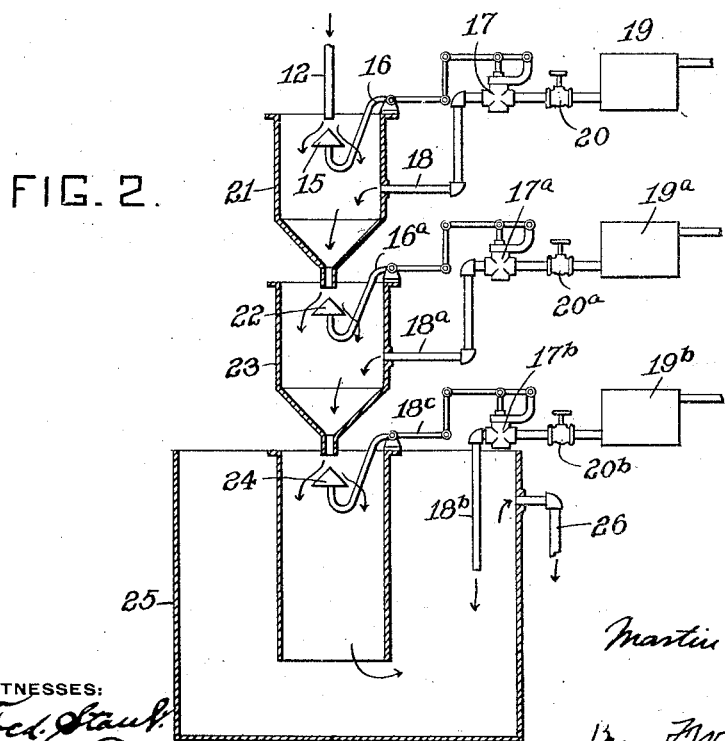

Figure 1 is a diagram and partial section of an intermittent system showing one form of my solution feeder in operation. Fig. 2 is a partial diagram showing the combination of several feeders for introducing several chemicals. Fig. 3 is a diagram and vertical section showing a modified form of the same.

In water purifying systems, the amount of raw water introduced may vary by varying the head, or by varying the capacity of the pipes, or by varying the speed of the flow; but under all conditions it is important to introduce an exactly proportional amount of the reagent, and always at the same rate of introduction, so that in the reaction tank the proportion of raw water and reagent will remain the same whether the water be introduced steadily or intermittently, or fast or slow.

In the device of Fig. 1, I represent at 5 an inlet emptying into a weir box 6 which has a large weir 7, emptying into a main pipe 8, which goes into the purifying system at any convenient point; and it also has a supplemental weir 9 which is usually smaller and empties into a siphon tank 10 which by means of a trap siphon 11 intermittently empties through the pipe 12 into a compartment 13 of a reaction tank 14. By this means, whatever is the rate of inflow at 5, there is always the same proportion of water flowing out through weirs 7 and 9, and whatever the rate of inflow at 10, there is always the same amount of water intermittently discharged through pipe 12. In front of the mouth of pipe 12 I place a valve-like disk 15 which will be depressed when water flows out at 12, in proportion to the impact of the flow. This disk is mounted on lever arm 16 which is linked to the operating piston of a controlling valve 17, placed in the inlet pipe 18, from a solution tank 19. This pipe also has a regulating valve 20. The water from pipe 12 and the reagent from pipe 18 are therefore introduced into reaction tank 14 always at the same time, and at corresponding rates, and in exactly proportional quantities. The feeding of the reagent being dependent on the impact of the inflowing water, is therefore controlled by the product of the volume by the velocity of the inflowing raw water. This proportional feed may be carried entirely through the system, in cases where more than one reagent is used. Thus in Fig. 2, the vessel 21 which receives raw water and the first reagent, may empty on the impact disk 22 which by its lever 16$^a$ governs the valve 17$^a$ feeding a second reagent from vessel 19$^a$ through pipe 18$^a$. This second reagent being mixed and the water treated therewith in vessel 23, this water in turn may by discharging upon impact disk 24 likewise control a third reagent introduced through pipe 18$^b$ into treatment tank 25, from whence by overflow 26 the water is carried off to the filter.

In Fig. 3 I show a modification wherein the discharge from the supply pipe 27 impinges upon a movable floating piston 28 in a cylinder 29 and overflows into the compartment of a treatment tank 31 emptying below the conical partition 32. The cylinder 29 is connected by pipe 33 to another piston cylinder 34 having a piston 35 which controls the adjustably weighted handle 36 of a valve 37 governing the flow of the reagent from a supply 38 which empties by a pipe 39 into the reaction vessel. This vessel has a partition 40 and overflow 41. In this modification, though the inflow at pipe 27 may momentarily fluctuate, yet the inertia of the liquid in the cylinders 29 and 24 and connecting pipe, will cause the valve 37 to be controlled by the average force of impact of the inflowing water on the disk 28. By reason of the shifting weight 42 or by valve 43, or both, the proportion of reagent to raw water can be readily adjusted.

By these described devices the feeding of a reagent can be made exactly proportional to the amount of raw water actually being introduced at any time, regardless of whether the inflow is steady or intermittent, regular or irregular, large or small in volume, or fast or slow in velocity.

The advantages of this device will readily occur to those familiar with the art.

Having thus described my invention and illustrated its use, what I claim as new and desire to secure by Letters Patent, is the following:

1. In water purifying apparatus, the combination with a water supply, a reaction tank, and a reagent supply, of means to regulate the feeding of reagent comprising a pipe discharging a freely falling column of water, an impact disk in the path of said water and a lever carrying said disk and connected operatively to a valve from the reagent supply.

2. In a water purifying system including a supply conduit, a reaction tank, and a reagent supply, having a conduit to the reaction tank, means for feeding the reagent comprising a valve in the reagent conduit, a lever connected thereto for operating the valve, an open-ended feed pipe discharging an unconfined stream into the reaction tank, and an impact disk carried by said lever and located at the mouth of said feed-pipe.

3. The combination with a series of reaction tanks and a series of reagent supplies, of a water inlet discharging an unconfined stream into each of said reaction tanks from the last tank in the series, and a valve in each reagent supply conduit, and means to operate said valves comprising an impact disk located in each reaction tank in the path of freely falling water entering therein, substantially as described.

4. In a water purifying system, the combination with a water supply having means to divert a definitely measured proportion, a tank receiving said portion, a siphon discharging from said tank an unconfined stream intermittently, a reaction tank receiving said stream, a chemical supply, a regulating valve therefor, and means to govern the instantaneous position of said valve comprising a lever connected to the valve at one end, and an impact disk at the other end of the lever located in the path of the freely falling water from the siphon, substantially as described.

In testimony whereof I have hereunder signed my name in the presence of the two subscribed witnesses.

MARTIN F. NEWMAN.

Witnesses:
F. W. H. CLAY,
H. M. WILLIS.